United States Patent
Hayes, Jr.

(10) Patent No.: US 9,176,719 B2
(45) Date of Patent: Nov. 3, 2015

(54) RESOLVING PREREQUISITES FOR A CLIENT DEVICE IN AN OPEN SERVICE GATEWAY INITIATIVE (OSGI) FRAMEWORK

(75) Inventor: Kent F. Hayes, Jr., Chapel Hill, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2712 days.

(21) Appl. No.: 10/787,520

(22) Filed: Feb. 26, 2004

(65) Prior Publication Data

US 2005/0193119 A1    Sep. 1, 2005

(51) Int. Cl.
*G06F 15/16*    (2006.01)
*G06F 9/445*    (2006.01)
*H04L 12/24*    (2006.01)

(52) U.S. Cl.
CPC .............. *G06F 8/61* (2013.01); *H04L 41/0806* (2013.01); *H04L 41/0853* (2013.01)

(58) Field of Classification Search
USPC ......................................................... 709/249
See application file for complete search history.

(56) References Cited

U.S. PATENT DOCUMENTS

| | | | |
|---|---|---|---|
| 6,389,464 B1 | 5/2002 | Krishnamurthy et al. | |
| 6,421,705 B1 | 7/2002 | Northrup | |
| 6,493,871 B1 * | 12/2002 | Welch et al. | 717/173 |
| 6,697,849 B1 * | 2/2004 | Carlson | 709/219 |
| 2002/0184226 A1 * | 12/2002 | Klicnik et al. | 707/100 |
| 2003/0023661 A1 * | 1/2003 | Clohessy et al. | 709/104 |
| 2003/0028869 A1 | 2/2003 | Drake et al. | |
| 2003/0131226 A1 * | 7/2003 | Spencer et al. | 713/100 |
| 2004/0117494 A1 * | 6/2004 | Mitchell et al. | 709/230 |
| 2004/0133538 A1 * | 7/2004 | Amiri et al. | 707/1 |
| 2005/0004974 A1 * | 1/2005 | Sharma et al. | 709/202 |

OTHER PUBLICATIONS

Inspec, AN-4341352, "Self-tuning and Adaptive Control with Personal Computers", Pfannstiel et al., Selected Papers from the Ninth IFAC/IFORS Symposium, pp. 1215-1220, vol. 2, Oxford, UK, 1992.
Inspec, AN-4852327, "New Software Tools for Design and Implementation of Complete High Performance Motion Systems", Antognini et al., 1994.
Weiss et al., "Goal-Oriented Software Assessment", 2002.
TDB No. 10b, Mar. 1992, pp. 141-145, "Personal Systems Functional Architectural Verification Methodology", Cabezas et al.
TDB No. v39, n3, Mar. 1996, pp. 363-366, "Anonymous Delivery of Goods in Electronic Commerce", Hauser et al.

* cited by examiner

*Primary Examiner* — Richard G Keehn
(74) *Attorney, Agent, or Firm* — Lee Law, PLLC; Christopher B. Lee

(57) ABSTRACT

Under the present invention, prerequisites are first determined on a server for one or more OSGi bundles that are to be loaded on a client device. Once determined, the prerequisites are communicated to the client device. Upon receipt, the client device will determine whether it has/meets the prerequisites. If not, any prerequisites that the client device does not have represent resource limitations that are communicated back to the server in a response. The server will then recursively resolve the prerequisites by identifying a final set (e.g., one or more) of OSGi bundles that fulfill the prerequisites within the resource limitations of the client device. Once all prerequisites are resolved, the final set OSGi bundles can be loaded on the client device.

29 Claims, 5 Drawing Sheets

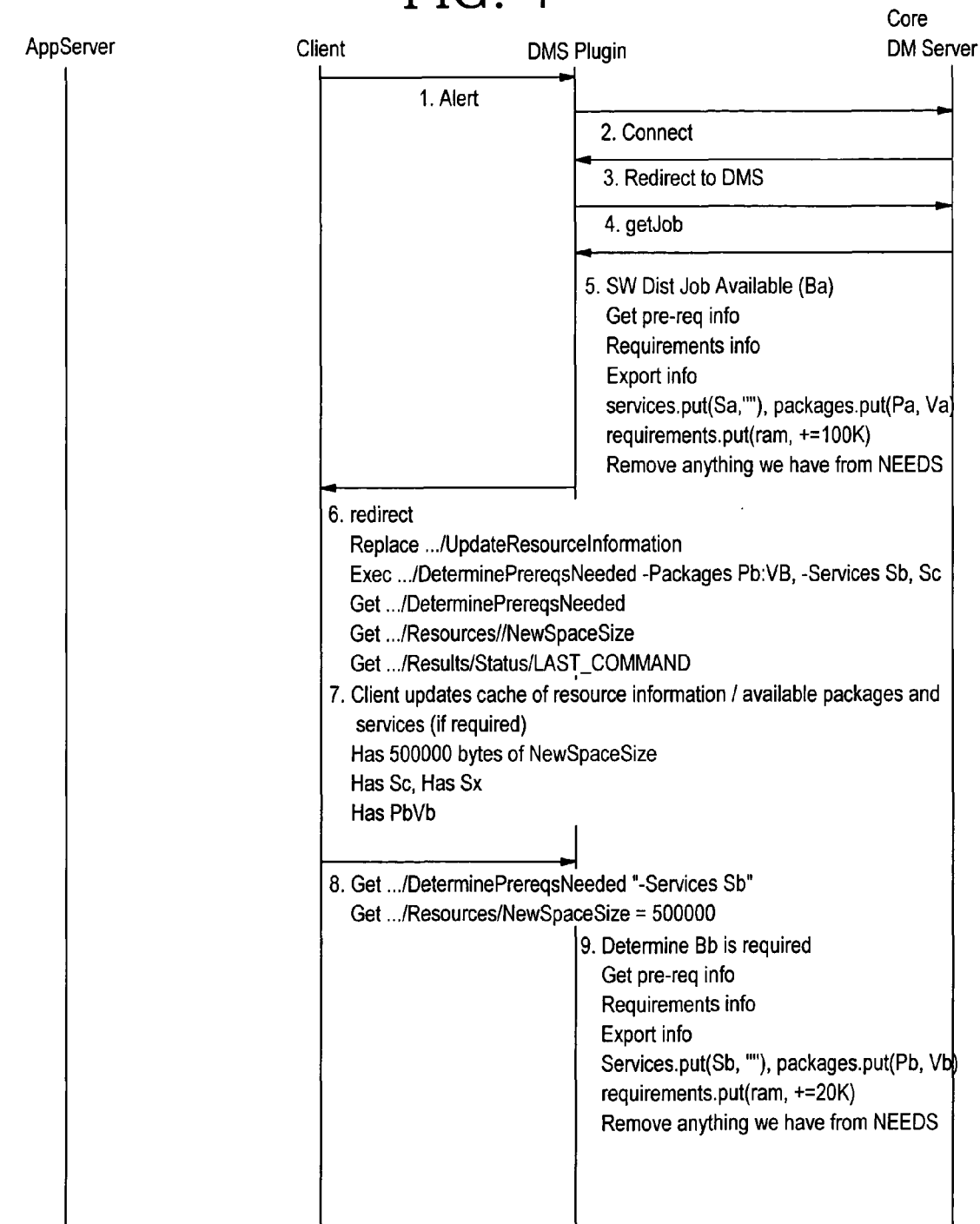

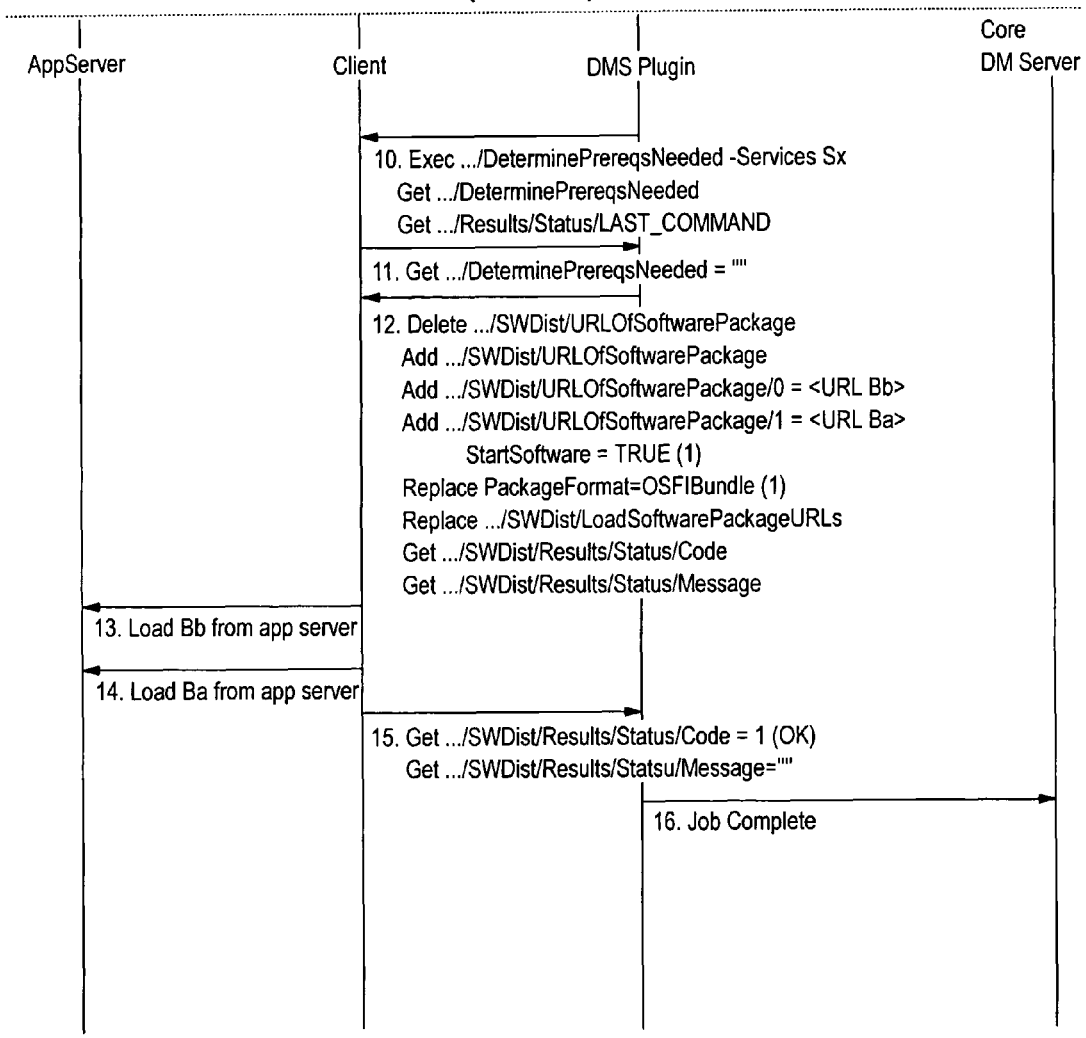

RESOLVING PREREQUISITES FOR A CLIENT DEVICE IN AN OPEN SERVICE GATEWAY INITIATIVE (OSGI) FRAMEWORK

BACKGROUND OF THE INVENTION

1. Field of the Invention

In general, the present invention relates to a method, system and program product for resolving prerequisites for client devices in an Open Service Gateway Initiative (OSGi) framework. Specifically, the present invention allows OSGi bundle prerequisites to be resolved while making efficient use of low bandwidth and/or high costs connections.

2. Related Art

As computer networking has become more advanced, a standard known as the Open Service Gateway Initiative (OSGi) has been developed. The OSGi is an industry plan to provide a standard way to deliver managed services to devices and local networks. With such a standard, home users could, for example, change the setting on their thermostat from a remote location (e.g., the workplace). In general, the OSGi provides a good framework for developing application components. Under the OSGi, a basic component is known as an OSGi bundle. An OSGi application can be made up of combinations/suites of bundles that might share common functionality. To this extent, the OSGi allows developers to define the dependencies between the bundles such as the packages and services required by the bundles. In a typical implementation, an OSGi architecture will include, among other components, a server and one or more client devices. Each client device will have an OSGi environment within which OSGi applications are deployed. Using a management program on the server, the functions of the OSGi applications can be controlled.

Unfortunately, as convenient as the OSGi framework can be, it currently fails to provide an efficient way to resolve prerequisites for OSGi bundles that are to be loaded on a client device. Specifically, a particular OSGi bundle might require that the client device have certain services, packages or computer resources (e.g., threads, RAM, etc.) to be properly run. If the client device fails to have the necessary prerequisites, the resource shortages should be addressed, or the OSGi bundle should not be loaded. The previous attempts at providing prerequisite resolution involved information flow solely from the client device to the server. Specifically, the client device would identify the OSGi bundles it had loaded thereon (e.g., by names and versions) to the server. The server would then use that information to look up the prerequisites in a repository or the like, and attempt to build a complete picture of the client device. Several disadvantages are posed with such an embodiment. First, since a single client device could have numerous OSGi bundles, communicating information about each one to the server is a large waste of bandwidth. Moreover, having the server receive the information and determine the prerequisites requires the server to be "all knowing" about the client device. This would disable the support of multiple management domains on a single client device. It would also break the process as soon as software appears on the client device that is not in the server's repository.

In view of the foregoing, there exists a need for a method, system and program product for resolving prerequisites for client devices in an OSGi framework. Specifically, a need exists whereby prerequisite resolution can occur while making efficient use of low bandwidth and/or high cost connections between the server and a client device.

SUMMARY OF THE INVENTION

In general, the present invention provides a method, system and program product for resolving prerequisites for client devices in an Open Service Gateway Initiative (OSGi) framework. Specifically, under the present invention, prerequisites are first determined on a server for one or more OSGi bundle(s) that is/are to be loaded on a client device. Once determined, the missing required prerequisites are communicated to the client device. Upon receipt, the client device will determine whether it has/meets the prerequisites. If not, any prerequisites that the client device does not have represent resource limitations that are communicated back to the server in a response. The server will then recursively resolve the prerequisites by identifying a final set (e.g., one or more) of OSGi bundles that fulfills the prerequisites within the resource limitations of the client device. Once all prerequisites are resolved, the final set of OSGi bundles can be loaded on the client device. However, if the prerequisites never get completely resolved, the process can be terminated and none of the OSGi bundles will be loaded on the client device.

A first aspect of the present invention provides a computer-implemented method for resolving prerequisites for client devices in an Open Service Gateway Initiative (OSGi) framework, comprising: determining, on a server, prerequisites for one or more OSGi bundle(s) to be loaded on a client device; communicating the prerequisites from the server to the client device; receiving a response from the client device, wherein the response identifies any resource limitations of the client device based on the prerequisites; and recursively resolving the prerequisites by identifying a final set of OSGi bundles on the server that fulfills the prerequisites within the resource limitations of the client device.

A second aspect of the present invention provides a computer-implemented method for recursively resolving prerequisites for client devices in an Open Service Gateway Initiative (OSGi) framework, comprising: determining, on a server, prerequisites for an OSGi bundle to be loaded on a client device; communicating the prerequisites from the server to the client device; receiving a response from the client device, wherein the response identifies any resource limitations of the client device based on the prerequisites; caching information derived from the response on the server; and resolving the prerequisites by recursively identifying a final set of OSGi bundles that fulfills the prerequisites within the resource limitations of the client device.

A third aspect of the present invention provides a computerized system for resolving prerequisites for clients devices in an Open Service Gateway Initiative (OSGi) framework, comprising: a prerequisite computation system for determining, on a server, prerequisites for an OSGi bundle to be loaded on a client device; a communication system for communicating the prerequisites from the server to the client device, and for receiving a response from the client device, wherein the response identifies any resource limitations of the client device based on the prerequisites; and a prerequisite resolution system for resolving the prerequisites by identifying a final set of OSGi bundles on the server that fulfills the prerequisites within the resource limitations of the client device.

A fourth aspect of the present invention provides a program product stored on a recordable medium for resolving prerequisites for clients devices in an Open Service Gateway Initiative (OSGi) framework, which when executed, comprises: program code for determining, on a server, prerequisites for an OSGi bundle to be loaded on a client device; program code for communicating the prerequisites from the server to the client device, and for receiving a response from the client device, wherein the response identifies any resource limitations of the client device based on the prerequisites; and program code for resolving the prerequisites by identifying a final set of OSGi bundles on the server that fulfills the prerequisites within the resource limitations of the client device.

Therefore, the present invention provides a method, system and program product for resolving prerequisites for client devices in an OSGi framework.

BRIEF DESCRIPTION OF THE DRAWINGS

These and other features of this invention will be more readily understood from the following detailed description of the various aspects of the invention taken in conjunction with the accompanying drawings in which:

FIG. 4 shows a second method flow diagram according to a detailed example of the present invention.

Figure 1:
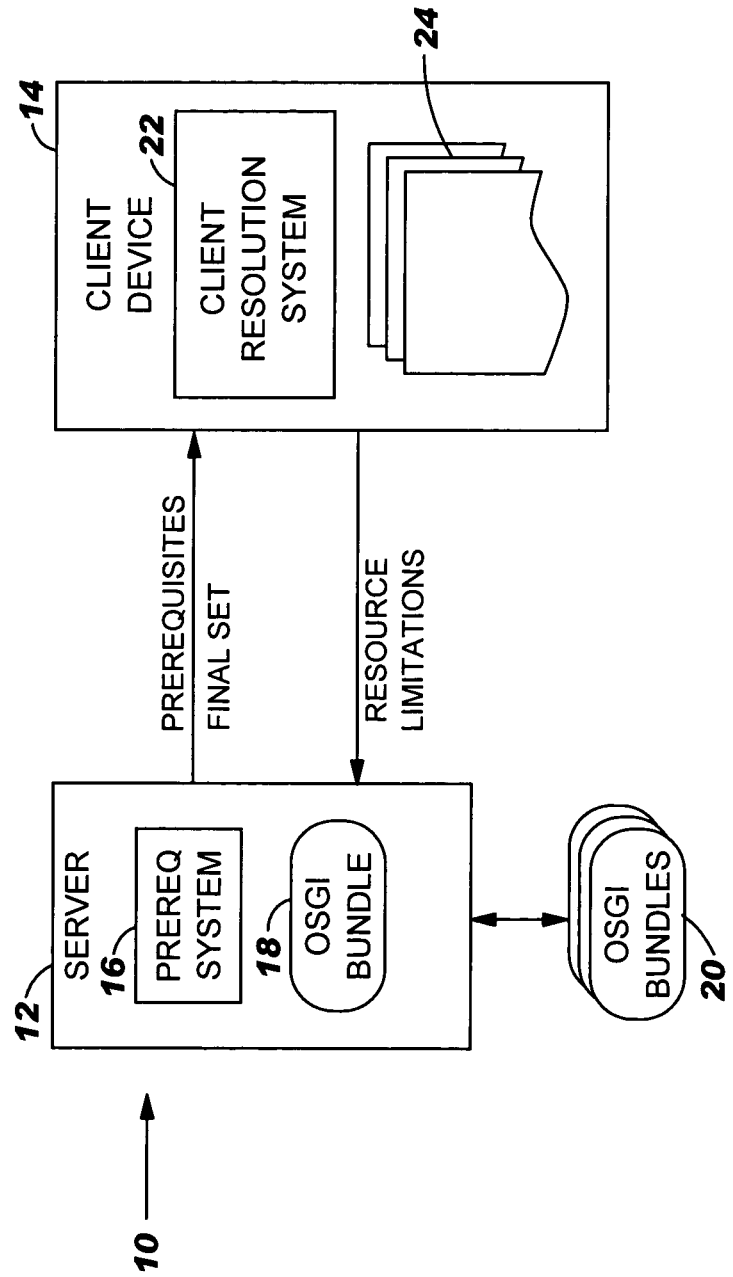
FIG. 1 depicts an illustrative system for resolving prerequisites for client devices in an OSGi framework according to the present invention.

It is noted that the drawings of the invention are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

For convenience purposes, the Detailed Description of the Drawings will have the following sections:
I. General Description
II. Detailed Example I. General Description As indicated above, the present invention provides a method, system and program product for resolving prerequisites for client devices in an Open Service Gateway Initiative (OSGi) framework. Specifically, under the present invention, prerequisites are first determined on a server for an OSGi bundle that is to be loaded on a client device. Once determined, the prerequisites are communicated to the client device. Upon receipt, the client device will determine whether it has/meets the prerequisites. If not, any prerequisites that the client device does not have represent resource limitations that are communicated back to the server in a response. The server will then recursively resolve the prerequisites by identifying a final set (e.g., one or more) of OSGi bundles that fulfills the prerequisites within the resource limitations of the client device. Once all prerequisites are resolved, the final set of OSGi bundles can be loaded on the client device. However, if the prerequisites never get completely resolved, the process can be terminated and none of the OSGi bundles will be loaded on the client device.

Referring now to FIG. 1, an illustrative system 10 for resolving prerequisites on client devices in an OSGi framework according to the present invention is shown. As depicted, system 10 includes server 12 and client device 14 (a single client device is shown for illustrative purposes only). It should be understood that the architecture shown herein is illustrative only and will likely include other known components not shown. For example, a typical embodiment of the invention would likely include a device, OSGi agents (on client device 14), a DMS server and one or more application servers. Moreover, it should be understood that a typical embodiment of the invention could include multiple servers 12 and a network dispatcher. As will be further described below in conjunction with the detailed example, redirect commands could be used to ensure that client device 14 communicates with the same server 12 throughout the resolution process.

In any event, client device 14 is intended to represent any type of computerized device capable of communicating over a network. For example, client device 14 could be a desktop computer (e.g., WIN-32-based), a hand held device, a set top box, a home appliance, a security system, etc. In any event, server 12 and client device 14 typically communicate over any type of network such as the Internet, a local area network (LAN), a wide area network (WAN), a virtual private network (VPN), etc. As such, communication between server 12 and client device 14 could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, client device 14 could utilize an Internet service provider to establish connectivity to server 12.

Under the present invention, server 12 will attempt to load one or more OSGi bundles 18 and 20 on client device 14. As known, an OSGi bundle is essentially a .JAR file with certain characteristics which enable it to effectively interact with the OSGi framework As such, an OSGi bundle has the ability to be controlled in a well defined manner. Specifically, as shown, server 12 includes prerequisite system 16, which can include parts of, or be included within any type of OSGi management program now known or later developed. When OSGi bundle 18 is desired to be loaded on client device 14, prerequisite system 16 will first determine the prerequisites needed. That is, in order for client device 14 to properly run OSGi bundle 18, certain services, packages, or computer resources (e.g., threads, RAM, etc.) might be needed. As known, under the OSGi, a "package" is similar to a JAVA package and a "service" is a certain type of interface. Typically, the prerequisites for OSGi bundle 18 will be determined by referencing information in a repository or the like. However, in another embodiment, the prerequisites could be determined by analyzing OSGi bundle 18.

Regardless, the prerequisites are known, prerequisite system 16 will communicate the same to client device 14. This communication could be made in response to a request by client device 14 (e.g., by an agent thereon). Upon receipt, client resolution system 22 will analyze the prerequisites and determine whether it has the needed resources 24. Specifically, client resolution system 22 will determine whether any prerequisites are lacking (from client device 14). In a typical embodiment, this information is determined from cache on client device 14. To this extent, client device 14 should maintain up to date information concerning its available computer resources, packages and services. Any prerequisites that are lacking represent "resource limitations" of client device 14 with respect to OSGi bundle 18. Once the analysis is complete, client resolution system 22 will generate and send a response back to server 12 that includes any resource limitations. Prerequisite system 16 will receive and cache the response (or information derived therefrom), and then attempt resolve the prerequisites in view of any resource limitations noted by client device 14. In a typical embodiment, prerequisite system 16 will resolve the prerequisites by identifying a final set (e.g., one or more) of OSGi bundles that fulfill the prerequisites within the resource limitations of client device 14 The final set of OSGi bundles could include any combination of OSGi bundle 18 and other OSGi bundles 20. For example, if client device 14 is lacking a certain service needed to properly run OSGi bundle 18, prerequisite system 16 will identify another OSGi bundle 20 that has the necessary service and than can operate within the computer resource limitations of client device 14. Similarly, if OSGi bundle 18 would require more RAM than client device 14 has, prerequisite system 16 could attempt to locate one or more other OSGi bundles 20 that could be substituted for OSGi bundle 18 and operate within the resource limitations of client device 14. To this extent, the final set of OSGi bundles could include only OSGi bundle 18 as originally planned, OSGi bundle 18 in addition to one or more other OSGi bundles 20, or one or more other OSGi bundles 20 without OSGi bundle 18.

In a typical embodiment, this process occurs recursively, meaning that the resolution is continuously repeated until all prerequisites are resolved, or until it has been determined that there are no remaining viable combinations of bundles to try (i.e., no combinations of bundles that can provide all needed packages and services that are missing on client device 14 within the resource limitations of client device 14). Recursive resolution is especially useful since any quantity or hierarchy of prerequisites might need resolution (e.g., other OSGi bundles 20 could themselves have prerequisites). Moreover, in a typical embodiment, once server 12 asks client device 14 about a particular resource or prerequisite, server 12 will not ask about that prerequisite or resource again (e.g., due to caching on server 12). In any event, once the prerequisites are completely resolved, prerequisite system 16 will load the final set of OSGi bundles on client device 14. Typically, the loading process includes server 12 sending client device 14 an instruction(s) pertaining the order in which OSGi bundles 18 and 20 should be loaded. However, if the prerequisites cannot be completely resolved, none of OSGi bundles 18 or 20 would be loaded.

Figure 2:
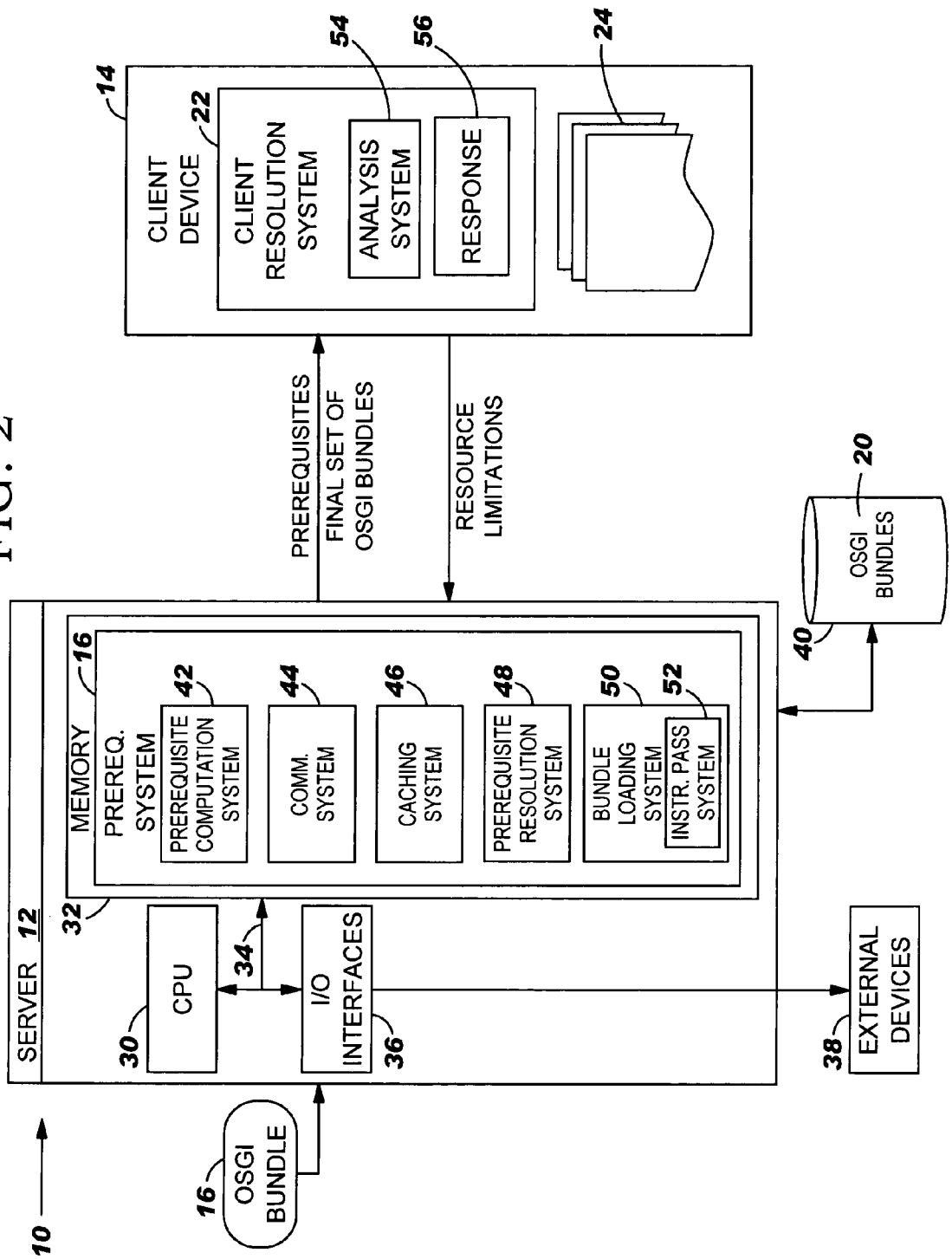
FIG. 2 depicts the system of FIG. 1 in greater detail.

Referring now to FIG. 2, a more detailed diagram of FIG. 1 is shown. As shown, server 12 generally comprises central processing unit (CPU) 30, memory 32, bus 34, input/output (I/O) interfaces 36, external devices/resources 38 and storage unit 40. CPU 30 may comprise a single processing unit, or be distributed across one or more processing units in one or more locations, e.g., on a client and computer system. Memory 32 may comprise any known type of data storage and/or transmission media, including magnetic media, optical media, random access memory (RAM), read-only memory (ROM), a data cache, etc. Moreover, similar to CPU 30, memory 32 may reside at a single physical location, comprising one or more types of data storage, or be distributed across a plurality of physical systems in various forms.

I/O interfaces 36 may comprise any system for exchanging information to/from an external source. External devices/resources 38 may comprise any known type of external device, including speakers, a CRT, LCD screen, handheld device, keyboard, mouse, voice recognition system, speech output system, printer, monitor/display, facsimile, pager, etc. Bus 34 provides a communication link between each of the components in server 12 and likewise may comprise any known type of transmission link, including electrical, optical, wireless, etc.

Storage unit 40 can be any system (e.g., database, repository, etc.) capable of providing storage for information under the present invention. Such information could include, for example, additional OSGi bundles, prerequisite information etc. As such, storage unit 40 could include one or more storage devices, such as a magnetic disk drive or an optical disk drive. In another embodiment, storage unit 40 includes data distributed across, for example, a local area network (LAN), wide area network (WAN) or a storage area network (SAN) (not shown). Although not shown, additional components, such as cache memory, communication systems, system software, etc., may be incorporated into server. In addition, it should also be appreciated that although not shown, client device 14 would likely include computerized components similar to server 12.

Shown in memory 32 of server 12 is prerequisite system 16, which includes prerequisite computation system 42, communication system 44, caching system 46, prerequisite resolution system 48, and bundle loading system 50 that itself includes instruction passing system 52. It should be understood that each of these systems includes program code/logic for carrying out the functions described herein. To this extent, the systems could be realized as plugins or the like. Regardless, when OSGi bundle 18 is desired to be loaded on client device 14, prerequisite computation system 42 will first determine the prerequisites needed for proper operation thereof. As indicated above, the prerequisites can be computed by accessing information in cache memory, storage unit 40 or the like. In another embodiment, prerequisite computation system 42 could include logic to analyze OSGi bundle 18 and compute the prerequisites. In either event, once the prerequisites are determined, prerequisite computation system 42 can check a running table of supplied services and packages, as maintained by prerequisite computation system 42 (e.g., in storage unit 40), and remove any prerequisites that are known to exist. Thereafter, communication system 44 will send the needed prerequisites to client device 14. As indicated above, this communication could be made in response to a request by client device 14 (e.g., by an agent thereon). Upon receipt, analysis system 54 within client resolution system 22 will analyze the prerequisites in view of available resources 24 and determine whether all needed prerequisites are present. As indicated above, this information is typically determined from cache on client device 14. To this extent, client device 14 should maintain up to date information concerning its available computer resources, packages and services. After the analysis, response system 56 will generate and send a response back to server 12. The response will identify any resource limitations of client device 14. For example, if client device 14 lacked a necessary service, or had insufficient RAM, those limitations would be noted in the response that is sent back to server 12.

Upon receipt, caching system 46 will cache the information from the response for future reference during the current prerequisite resolution process. Thereafter, prerequisite resolution system (engine) 48 will begin the process of recursively resolving the prerequisites. Typically, this involves identifying a final set of bundles that fulfill the prerequisites within the resource limitations of client device 14. For example, as indicated above, if client device lacked a needed service 18, prerequisite resolution system 48 would attempt to identify another OSGi bundle 20 that had the needed service, and that could operate within the resource limitations of client device 14. Alternatively, if client device had insufficient computer resources (e.g., RAM) to properly run OSGi bundle 18, prerequisite resolution system 48 could attempt to identify one or more OSGi bundles 20 that could be substituted for OSGi bundle 18, and that could run within the resource limitations of client device 14. In any event, the resolution process will be implemented recursively until all prerequisites are resolved or until it has been determined that there are no remaining viable combinations of bundles to try (i.e., no combinations of bundles that can provide all needed packages and services that are missing on client device 14 within the resource limitations of client device 14). If all prerequisites are completely resolved, bundle loading system 50 will load the final set of OSGi bundles (e.g., 18 and/or 20) on client device 14. To this extent, instruction passing system 52 will generate and pass an instruction to client device 14 regarding the order in which OSGi bundles 18 and/or 20 should be loaded. If, however, all prerequisites cannot be resolved, none of the OSGi bundles 18 or 20 will be loaded on client device.

As can be seen, because the present invention does not require bulk transmission of information from client device 14, or a complete knowledge of client device 14 on the part of server 12, the present invention is ideal for all types of network connections including low bandwidth or high cost connections.

Figure 3:
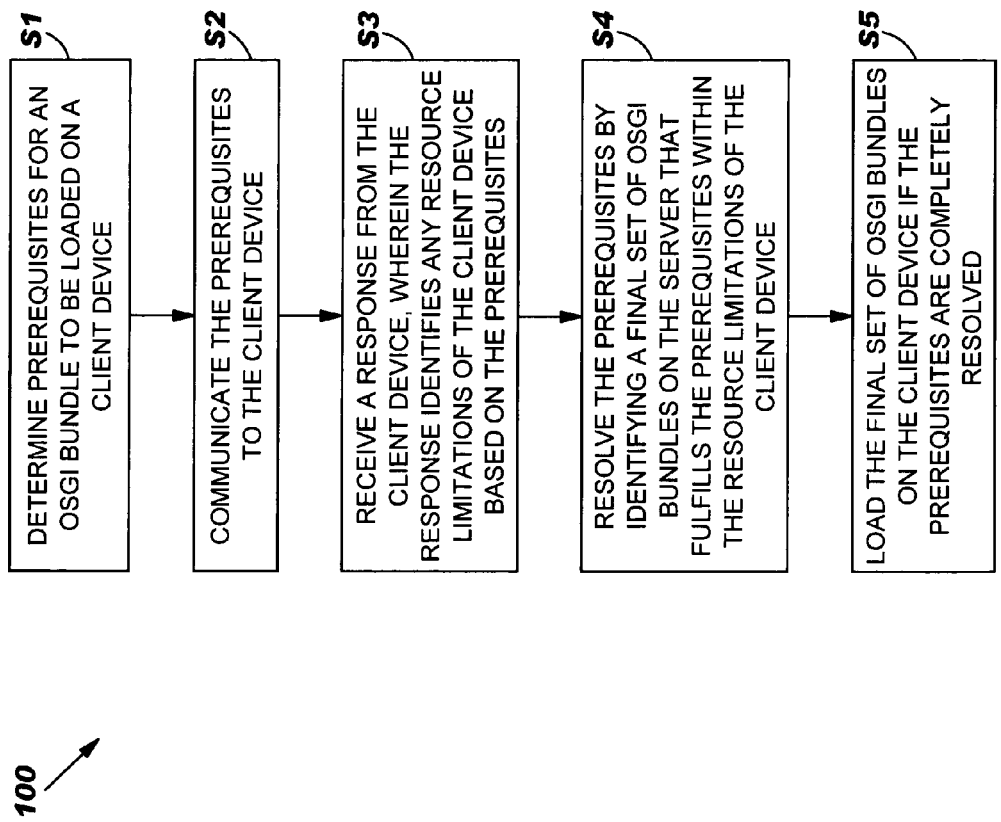
FIG. 3 depicts a first method flow diagram according to the present invention.

Referring now to FIG. 3, a method flow diagram 100 according to the present invention is shown. As depicted, first step S1 is to determine prerequisites for an OSGi bundle to be loaded on a client device. Second set S2 is to communicate the prerequisites from the server to the client device. Third step S3 is to receive a response from the client device, wherein the response identifies any resource limitations of the client device based on the prerequisites. Fourth step S4 is to resolve the prerequisites by identifying a final set of OSGi bundles on the server that fulfills the prerequisites within the resource limitations of the client device. Fifth step S5 is to load a final set of OSGi bundles on the client device if the prerequisites are completely resolved.

II. Detailed Example

Referring now to FIG. 4, a method flow diagram of a detailed example according to the present invention is shown. In this example, assume the following definitions:

PaV1.0=OSGi Package_a Version 1.0
PbVb=OSGi Package_b Version b
Sa=Service_a
Sb=Service_b
Sc=Service_c
Sx=Service_x
Ba=Bundle_a
Bb=Bundle_b
Bc=Bundle_c Further assume that the client device has Sc, Sx, PbVb and 500,000 bytes of NewSpaceSize. Still yet, assume the following bundles with the associated requirements are available for distribution:

| | | |
|---|---|---|
| Ba | | |
| | Exports | |
| | | PaV1.0 |
| | | Sa |
| | Imports | |
| | | PbVb |
| | | Sb |
| | | Sc |
| | Requires | |
| | | 100,000 bytes NewSpaceSize |
| Bb | | |
| | Exports | |
| | | PbVb |
| | | Sb |
| | Imports | |
| | | Sx |
| | Requires | |
| | | 20,000 bytes NewSpaceSize |
| Bc | | |
| | Exports | |
| | | Sc |
| | Imports | |
| | Requires | |
| | | 10,000 bytes NewSpaceSize |

Referring now to the flow diagram in FIG. 4, the sequence of steps will be explained in further detail. In step 1, the client device (e.g., SyncML) sends an alert to a Device Management System (DMS) plugin (e.g., the prerequisite computation 42 system of FIG. 2). In step 2, a connect event is sent to the device management server. In step 3, the device management server responds by instructing the plugin to redirect the client device directly to the current server, thus, bypassing any possible network dispatcher. In step 4, the plugin gets a software distribution job that is available to run for Ba. In step 5, the plugin will start to determine the prerequisites (e.g., computer and non-computer resources) for bundle Ba. This information can be obtained from a repository, cache or computed by prerequisite computation system 42 of FIG. 2). As indicated above, bundle Ba requires PbV1.1, Sb, Sc and 100,000 bytes of RAM to run. A running table of supplied services and packages will be checked, and anything that is already obtained will be removed for the list of needs. Then, in step 6, the plugin will send a redirect command to the OSGi agent in the event that there is a network dispatcher between the client device and the server. This allows the server to maintain the state so that the client device can communicate with the same DMS server for the duration of the polling cycle. The plugin will also send the following commands to the client device:

Replace . . . /UpdateResourceInformation
Exec( . . . /DeterminePrereqsNeeded—Packages Pb:Vb,
—Services Sb, Sc),
Get ( . . . /DeterminePrereqsNeeded)
Get( . . . /Resources/NewSpaceSize)

NOTE: The information from the above get commands could have been returned as a response from the corresponding exec command in an alternative implementation. The same is true for similar exec/get pairs below.

NOTE: In the present embodiment of the invention, SyncML DM is used for communication between the client device and the server.

Get( . . . /Results/Status/LAST_COMMAND)

The Replace command is for ease of implementation of the OSGi SyncML/DM client device. Specifically, the command informs the client device that it should make sure that any information it is caching about available resources, packages, and services is up to date. This command may be removed as the client device implementation develops.

In step 7, the client device makes sure any cached information concerning available computer resources, packages and services is up to date. Assume that the client device has 500,000 bytes of NewSpaceSize available and services Sc and Sx. In step S8, the client device returns the following information to the plugin:

Get ( . . . /DeterminePrereqsNeeded)="—Services Sb"
Get( . . . Resources/NewSpaceSize)=500000

Alternatively, this information could have been returned as a response to the aforementioned exec command. The same is holds true in similar exec/get pairs/cases below.

In any event, this information will bypass the network dispatcher. The agent will continue to bypass the network dispatcher for the duration of the management session. In step 9, the information about the levels of available resources and what packages and services are known to be, and not to be on the client device will be cached on the server. The client device will not be asked about any of the information that the server knows or can infer about the levels of resources and availability (or lack there of) packages and services. The plugin should then determine that bundle Bb can provide the missing packages and services. As indicated above, Bundle B requires 20,000 bytes of NewSpaceSize and service Sx. The plugin continues to compile the total resource requirements for the bundle to be distributed and any prerequisites which need to be loaded to the client device. Moreover, the plugin extracts the information about the bundle from the cache and tracks the required services, packages, and resource requirements as follows:

services.put(Sb, " ")
    packages.put(Pb, "1.1"); —Note that the package version available on the client is 1.0—it would need to be version 1.1 or greater to be an appropriate prerequisite
    requirements.put("NewSpaceSize", requirements.get (NewSpaceSize)+20000)
    BundlesToBeLoaded.push[Bb];
    Needs (Sx, NewSpaceSize=120K)

It should be noted that the required resources (NewSpaceSize, Threads, etc.), are cumulative—they are the total of the primary software package to be loaded and any required resources needed by prerequisites which must be loaded. In any event, the running table of supplied services and packages would be checked, and anything that is already obtained would be removed from the list of needs above.

In step 10, the plugin will send the following command to the client device:

Exec( . . . /DeterminePrereqsNeeded "—Services Sx")
    Get ( . . . /DeterminePrereqsNeeded)
    Get( . . . /Results/Status/LAST_COMMAND)—This is for ease of client implementation and may be removed later as appropriate.

In step 11, the client device responses with:

Get( . . . /DeterminePrereqsNeeded)=" " (i.e., Nothing Needed)

In step 12, the plugin gets the list of bundles to be loaded as follows:

BundlesToBeLoaded.pop( )=Bb=must be loaded first
    BundlesToBeLoaded.pop( )=Ba=must be loaded last Thereafter the plugin will send:

Delete( . . . /SWDist/URLOfSoftwarePackage)
    Add( . . . /SWDist/URLOfSoftwarePackage)
    Add( . . . /SWDist/URLOfSoftwarePackage/0)=<URL Bb>)
    Add( . . . /SWDist/URLOfSoftwarePackage/0)=<URL Ba>)
    Replace( . . . SWDist/StartSoftware)=TRUE (1)
    Replace( . . . /SWDist/LoadSoftwarePackageURLs)=" "
    Get( . . . /SWDist/Results/Status/Code)
    Get( . . . /SWDist/Results/Status/Message)

In step 13, the client device loads Bundle B from the (application) server In step 14, the client device loads Bundle A from the (application) server. In step 15, the client device response with the following:

Get ( . . . /SWDist/Results/Status/Code)=OK (1)
    Get ( . . . /SWDist/Results/Status/<message>)=" "

Finally, the fact that the job completed successfully for the client device is recorded in the DMS database in step 16.

It should be understood that this embodiment of the invention is implemented using SynchML DM. Specifically, communication between the client device and the server typically occurs using the SyncML DM protocol. It should also be understood that the present invention can be realized in hardware, software, or a combination of hardware and software. Any kind of computer system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, the illustrative representation of prerequisite system 16 shown in FIG. 2 is not intended to be limiting. That is, the functions of the present invention described herein could be represented by a different configuration of systems.

I claim:

1. A computer-implemented method for resolving prerequisites for client devices in an Open Service Gateway Initiative (OSGi) framework, comprising:

determining, on a server device, prerequisites for an OSGi bundle to be loaded on a client device, the prerequisites comprising a set of all OSGi bundles that are necessary for utilizing the OSGi bundle;

communicating, prior to communicating any of the OSGi bundles to the client device, a list of the prerequisites from the server device to the client device;

receiving a response from the client device, wherein the response identifies any resource limitations of the client device determined by the client device based on a comparison of the list of the prerequisites and current OSGi package and OSGi service interface resources of the client device, the resource limitations comprising all prerequisites of the list of the prerequisites that are not currently present on the client device;

automatically recursively resolving via the server device, in response to determining that the list of the prerequisites that are not currently present on the client device would not require more client device OSGi package and OSGi service interface resources than the current OSGi package and OSGi service interface resources of the client device, the prerequisites by identifying a final set of OSGi bundles on the server device that fulfills the prerequisites within the resource limitations of the client device; and substituting via the server device, in response to determining that the list of the prerequisites that are not currently present on the client device would require more client device OSGi package and OSGi service interface resources than the current OSGi package and OSGi service interface resources of the client device, at least one other OSGi bundle that operates within the resource limitations of the client device for one of the OSGi bundles and one of the prerequisites of the list of the prerequisites that are not currently present on the client device.

2. The method of claim 1, further comprising loading the final set of OSGi bundles on the client device if the prerequisites are completely resolved.

3. The method of claim 2, wherein the loading comprises the server device instructing the client device to load the final set of OSGi bundles in a particular order.

4. The method of claim 1, wherein the prerequisites comprise at least one item selected from a group consisting of a service, a package and a computer resource needed by client device.

5. The method of claim 1, further comprising caching information derived from the response on the server device.

6. The method of claim 1, wherein the method is applied in the presence of a low bandwidth or high cost connection between the server device and the client device.

7. The method of claim 1, wherein the final set of OSGi bundles include OSGi bundles that are identified from a repository accessed by the server device.

8. The method of claim 1, further comprising:
receiving the prerequisites on the client device;
determining whether the client device has the prerequisites, wherein any of the prerequisites that the client device does not have represent the resource limitations; and
sending the response to the server device, wherein the response includes the resource limitations.

9. A computer-implemented method for recursively resolving prerequisites for client devices in an Open Service Gateway Initiative (OSGi) framework, comprising:
determining, on a server device, prerequisites for an OSGi bundle to be loaded on a client device, the prerequisites comprising a set of all OSGi bundles that are necessary for utilizing the OSGi bundle;
communicating, prior to communicating any of the OSGi bundles to the client device, a list of the prerequisites from the server device to the client device;
receiving a response from the client device, wherein the response identifies any resource limitations of the client device determined by the client device based on a comparison of the list of the prerequisites and current OSGi package and OSGi service interface resources of the client device, the resource limitations comprising all prerequisites of the list of the prerequisites that are not currently present on the client device;
caching information derived from the response on the server device;
automatically recursively resolving via the server device, in response to determining that the list of the prerequisites that are not currently present on the client device would not require more client device OSGi package and OSGi service interface resources than the current OSGi package and OSGi service interface resources of the client device, the prerequisites by recursively identifying a final set of OSGi bundles on the server device that fulfills the prerequisites within the resource limitations of the client device; and
substituting via the server device, in response to determining that the list of the prerequisites that are not currently present on the client device would require more client device OSGi package and OSGi service interface resources than the current OSGi package and OSGi service interface resources of the client device, at least one other OSGi bundle that operates within the resource limitations of the client device for one of the OSGi bundles and one of the prerequisites of the list of the prerequisites that are not currently present on the client device.

10. The method of claim 9, further comprising loading the final set of OSGi bundles on the client device if the prerequisites are completely resolved.

11. The method of claim 10, wherein the loading comprises the server device instructing the client device to load the final set of OSGi bundles in a particular order.

12. The method of claim 9, wherein the prerequisites comprise at least one item selected from a group consisting of a service, a package and a computer resource needed by client device.

13. The method of claim 9, wherein the method is applied in the presence of a low bandwidth or high cost connection between the server device and the client device.

14. The method of claim 9, further comprising:
receiving the prerequisites on the client device;
determining whether the client device has the prerequisites, wherein any of the prerequisites that the client device does not have represent the resource limitations; and
sending the response to the server device, wherein the response includes the resource limitations.

15. A computerized system for resolving prerequisites for client devices in an Open Service Gateway Initiative (OSGi) framework, comprising:
a memory that stores OSGi bundle information at a server device; and
a processor programmed to execute:
a prerequisite computation system for determining, on the server device, prerequisites for an OSGi bundle to be loaded on a client device, the prerequisites comprising a set of all OSGi bundles that are necessary for utilizing the OSGi bundle;
a communication system for communicating, prior to communicating any of the OSGi bundles to the client device, a list of the prerequisites from the server device to the client device, and for receiving a response from the client device, wherein the response identifies any resource limitations of the client device determined by the client device based on a comparison of the list of the prerequisites and current OSGi package and OSGi service interface resources of the client device, the resource limitations comprising all prerequisites of the list of the prerequisites that are not currently present on the client device; and
a prerequisite resolution system for:
automatically recursively resolving via the server device, in response to determining that the list of the prerequisites that are not currently present on the client device would not require more client device OSGi package and OSGi service interface resources than the current OSGi package and OSGi service interface resources of the client device, the prerequisites by identifying a final set of OSGi bundles stored within the memory at the server device that fulfills the prerequisites within the resource limitations of the client device; and
substituting via the server device, in response to determining that the list of the prerequisites that are not currently present on the client device would require more client device OSGi package and OSGi service interface resources than the current OSGi package and OSGi service interface resources of the client device, at least one other OSGi bundle that operates within the resource limitations of the client device for one of the OSGi bundles and one of the prerequisites of the list of the prerequisites that are not currently present on the client device.

16. The system of claim 15, where the processor is further programmed to execute a bundle loading system for loading the final set of OSGi bundles on the client device if the prerequisites are completely resolved.

17. The system of claim 16, wherein the bundle loading system comprises an instruction passing system for instructing the client device to load the final set of OSGi bundles in a particular order.

18. The system of claim 15, wherein the prerequisites comprise at least one item selected from a group consisting of a service, a package and a computer resource needed by client device.

19. The system of claim 15, where the processor is further programmed to execute a response caching system for caching information derived from the response within the memory at the server device.

20. The system of claim 15, where the memory comprises a repository and wherein the final set of OSGi bundles includes OSGi bundles that are identified from the repository accessed by the server device.

21. The system of claim 15, where the processor is further programmed to process the response generated via:
   an analysis system executing on the client device that determines whether the client device has the prerequisites, wherein any prerequisites that the client device does not have are identified as the resource limitations; and
   a response system that sends the response from the client device to the server device.

22. The system of claim 15, wherein the system uses SyncML DM protocol for communication between the client device and the server device.

23. A program product stored on a storage memory and executed by a computer for resolving prerequisites for clients devices in an Open Service Gateway Initiative (OSGi) framework, comprising:
   program code for determining, on a server device, prerequisites for an OSGi bundle to be loaded on a client device, the prerequisites comprising a set of all OSGi bundles that are necessary for utilizing the OSGi bundle;
   program code for communicating, prior to communicating any of the OSGi bundles to the client device, a list of the prerequisites from the server device to the client device, and for receiving a response from the client device, wherein the response identifies any resource limitations of the client device determined by the client device based on a comparison of the list of the prerequisites and current OSGi package and OSGi service interface resources of the client device, the resource limitations comprising all prerequisites of the list of the prerequisites that are not currently present on the client device;
   program code for automatically recursively resolving via the server device, in response to determining that the list of the prerequisites that are not currently present on the client device would not require more client device OSGi package and OSGi service interface resources than the current OSGi package and OSGi service interface resources of the client device, the prerequisites by identifying a final set of OSGi bundles on the server device that fulfills the prerequisites within the resource limitations of the client device; and
   program code for substituting via the server device, in response to determining that the list of the prerequisites that are not currently present on the client device would require more client device OSGi package and OSGi service interface resources than the current OSGi package and OSGi service interface resources of the client device, at least one other OSGi bundle that operates within the resource limitations of the client device for one of the OSGi bundles and one of the prerequisites of the list of the prerequisites that are not currently present on the client device.

24. The program product of claim 23, further comprising program code for loading the final set of OSGi bundles on the client device if the prerequisites are completely resolved.

25. The program product of claim 24, wherein the program code for loading comprises program code for instructing the client device to load the final set of OSGi bundles in a particular order.

26. The program product of claim 23, wherein the prerequisites comprise at least one item selected from a group consisting of a service, a package and a computer resource needed by client device.

27. The program product of claim 23, further comprising program code for caching the information derived from the response on the server device.

28. The program product of claim 23, wherein the final set of OSGi bundles includes OSGi bundles that are identified from a repository accessed by the server device.

29. The program product of claim 23, further comprising:
   program code for determining whether the client device has the prerequisites, wherein any prerequisites that the client device does not have are identified as the resource limitations; and
   program code for sending the response from the client device to the server device.

* * * * *